United States Patent [19]

Suzuki et al.

[11] Patent Number: 4,467,765

[45] Date of Patent: Aug. 28, 1984

[54] METHOD AND SYSTEM FOR OPERATING AN ENGINE AT MAXIMUM TORQUE WITH VARIABLE AMOUNT OF DITHER

[75] Inventors: Atsushi Suzuki; Masakazu Ninomiya, both of Kariya; Hiroyasu Fukaya, Nagoya; Susumu Akiyama, Kariya, all of Japan

[73] Assignee: Nippondenso Co., Ltd., Kariya, Japan

[21] Appl. No.: 352,563

[22] Filed: Feb. 26, 1981

[30] Foreign Application Priority Data

Mar. 2, 1981 [JP] Japan ............................ 56-30148

[51] Int. Cl.$^3$ ............................................ F02P 5/08
[52] U.S. Cl. .................................. 123/419; 123/417; 123/421
[58] Field of Search ............... 123/416, 417, 419, 418, 123/421, 415, 436, 480, 486

[56] References Cited

U.S. PATENT DOCUMENTS

| | | | |
|---|---|---|---|
| 4,026,251 | 5/1977 | Schweitzer et al. | 123/419 |
| 4,130,863 | 12/1978 | Schweitzer et al. | 123/416 |
| 4,286,560 | 9/1981 | Sagisaka et al. | 123/416 |
| 4,306,284 | 12/1981 | Malcolm | 123/416 |
| 4,322,800 | 3/1982 | Hisegawa et al. | 123/417 |
| 4,367,711 | 1/1983 | Ikeura | 123/417 |
| 4,379,333 | 4/1983 | Ninomiya et al. | 123/417 |

Primary Examiner—Andrew M. Dolinar
Attorney, Agent, or Firm—Cushman, Darby & Cushman

[57] ABSTRACT

Spark ignition timing of an internal combustion engine is oscillated on each side of a variable reference setting during successive ignition phases and the resultant engine speed is detected during at least three successive phases. The detected engine speed values are compared one against each other to determine whether they satisfy one of two specified conditions. The variable reference is adjusted in a direction toward an optimum position depending on which one of the conditions is satisfied. At least one of controlled parameters including the magnitude of the oscillated setting with respect to the variable reference, the length of the ignition phase and the amount of the adjusted reference setting, is varied as a function of an engine operating parameter.

12 Claims, 10 Drawing Figures

| Ne\Pm | --- | --- | r-2 | r-1 | r | r+1 | r+2 | --- | --- |
|---|---|---|---|---|---|---|---|---|---|
| --- | | | | | | | | | |
| --- | | | | | | | | | |
| P-1 | | | θb(P-1,r-2) | θb(P-1,r-1) | θb(P-1, r) | θb(P-1,r+1) | θb(P-1,r+2) | | |
| P | | | θb(P,r-2) | θb(P,r-1) | θb(P, r) | θb(P,r+1) | θb(P,r+2) | | |
| P+1 | | | θb(P+1,r-2) | θb(P+1,r-1) | θb(P+1,r) | θb(P+1,r+1) | θb(P+1,r+2) | | |
| --- | | | | | | | | | |
| --- | | | | | | | | | |

METHOD AND SYSTEM FOR OPERATING AN ENGINE AT MAXIMUM TORQUE WITH VARIABLE AMOUNT OF DITHER

BACKGROUND OF THE INVENTION

The present invention relates to a method and system for operating an internal combustion engine at maximum output torque under varying operating conditions by oscillating the setting of ignition timing on each side of a variable reference setting.

Spark ignition timing is usually controlled in response to engine variables such as crankshaft speed and intake vacuum so that the engine output torque is at maximum while fuel consumption rate is reduced to a minimum in so far as it causes no problem in knocking and exhaust gas emission. However, due to difficulties inherent in calibrating engines to their particular operating characteristics during manufacture, ignition advance setting is not necessarily adjusted to the optimum value for each engine. Even if such calibration is achieved, the operating characteristics of the engine tend to vary as a function of environmental factors and aging and the particular ignition setting would cease to be the optimum setting.

A spark ignition control system, shown and described in U.S. Pat. No. 3,142,967 granted to Paul H. Schweitzer, discloses a system in which the ignition setting is oscillated or dithered on either side of a variable reference setting to detect the resultant variation in engine output variable such as engine speed at two consecutive points in time. The reference advance timing is corrected in one way or another in response to the result of comparison between the detected output engine variables. If the engine speed variation resulting from an ignition dithered in the advance direction is greater than that resulting from a subsequent ignition dithered in the retard direction, the reference setting is advanced by a predetermined amount, and if the situation is reversed the reference setting is retarded. The process is repeated so that ignition timing is maintained at an optimum position at which the engine delivers maximum output power. Since the corrective indications are derived from two successive engine output variables, the prior art system has an inherent difficulty in distinguishing between the variations caused by dither actions and those caused by manual acceleration or deceleration.

Co-pending U.S. patent application Ser. No. 159,435 filed June 13, 1980, now U.S. Pat. No. 4,379,333 and assigned to the same assignee as the present invention discloses an improved ignition control system in which the variation of engine output variable is detected at three successive points in time and compared against each other to determine which one of two specified conditions is established. Since the ignition setting is dithered between discrete values, however, there is occasioned a large amount of engine speed variation with a resultant poor driveability.

SUMMARY OF THE INVENTION

The primary object of the present invention is therefore to eliminate the driveability problem by oscillating the ignition setting by an amount which is a function of an engine operating parameter.

The invention provides an improved method of operating an internal combustion engine at maximum output torque under varying operating conditions. The method comprises oscillating the setting of the input engine variable on each side of a variable reference setting by varying the setting of an adjustable input engine variable, sensing an output engine variable representative of the speed of the engine at least three successive phases of the oscillation, phases of the oscillation; detecting whether the sensed output variables establish one of first and second sequential relationships indicating that the variable reference setting is on one or the other side of an optimum position respectively and any other sequential relationship. The method further includes adjusting the variable reference setting toward the optimum position according to the detected first or second relationship to vary at least one of controlled parameters as a function of an engine operating parameter, the controlled parameters including the magnitude of the oscillated setting with respect to said variable reference setting, the length of said phase and the amount of the adjusted reference setting.

Since the engine operating parameter is taken into account, the magnitude of engine speed variations is reduced to a minimum and the driveability of the engine is significantly improved.

BRIEF DESCRIPTION OF THE DRAWINGS

The invention will be described in further detail with reference to the accompanying drawings wherein.

DETAILED DESCRIPTION

Figure 1:
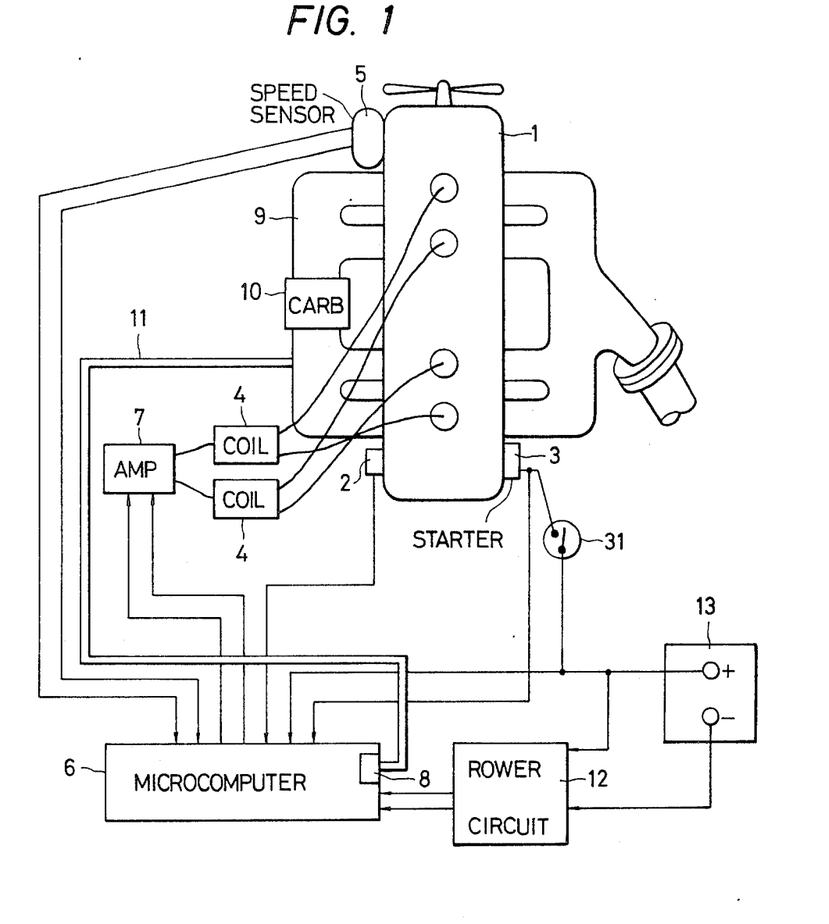
FIG. 1 is a block diagram of an embodiment of the ignition control system.

Referring now to FIG. 1, there is shown an ignition control system of the present invention. Numeral 1 indicates a four-cylinder internal combustion engine having an intake manifold 9 and a carburetor 10. An engine coolant temperature sensor 2 and a crankshaft revolution sensor 5 are provided to sense the engine temperature and engine speed to generate respective signals for application to a microcomputer 6. The engine speed sensor 5 is a device which generates a reference pulse signal in response to an engine piston reaching its top dead center and seccessively generates a crankangle signal at each crankangle of 30 degrees, so that a total of twelve pulse signals is generated for each 360-degree revolution of the crankshaft. The engine is started by a starter 3 in response to a switch 31 which connects it to a positive terminal of a battery 13 in a conventional manner. Ignition coils 4 are activated by ignition timing signals supplied via amplifier 7 from the microcomputer 6 to generate high tension voltage which is distributed to the spark plug of each cylinder at every 90-degree crankshaft rotation. An intake air pressure sensor 8, provided in the computer 6, is in communication with the intake manifold 9 via conduit 11 to detect the pressure of air introduced to the engine.

The microcomputer 6, powered by a power control circuit 12 that stabilizes the voltage supplied from the battery 13, operates on the crankangle signals to detect the engine speed and operates on the detected intake pressure signal to derive ignition timing signal in a manner as will be described later. The microcomputer 6 also receives a voltage signal directly from the battery 13 to detect its potential variations and further receives an engine start signal from the engine start switch 31 to vary the ignition timing during engine startup periods in accordance with these operating parameters.

Figure 2:
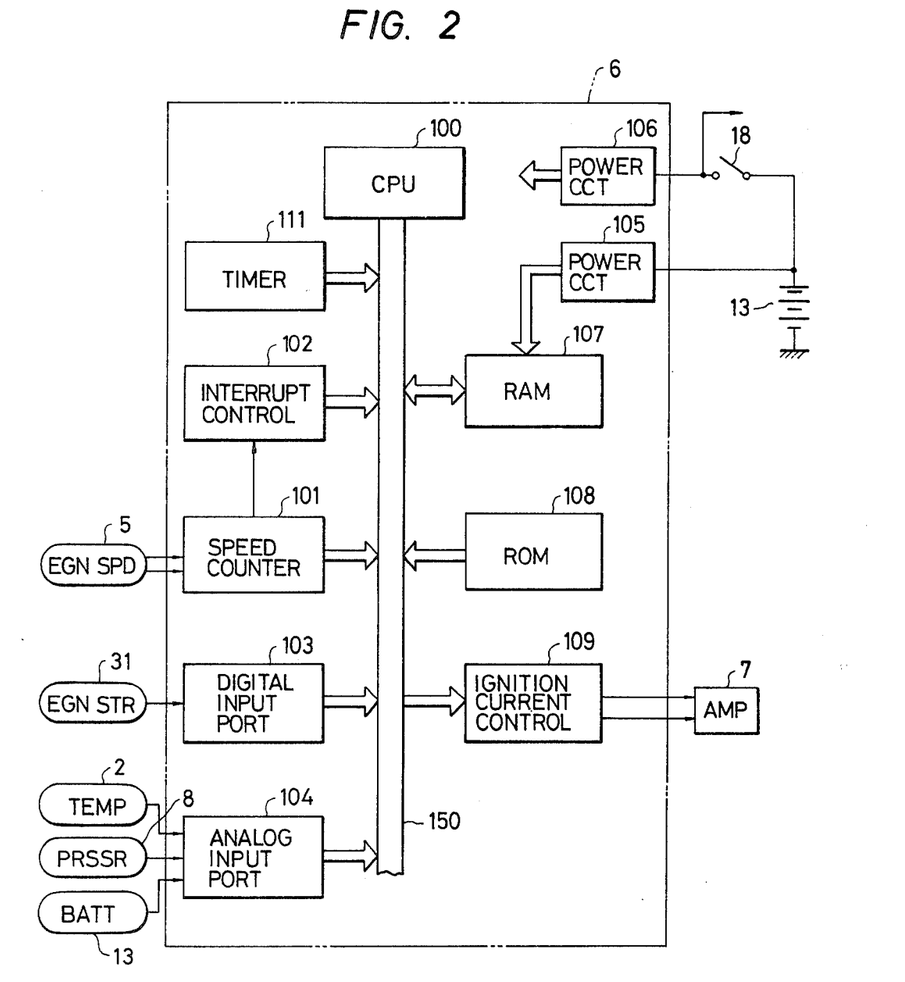
FIG. 2 is a block diagram of the microcomputer of FIG. 1.

The hardware of the microcomputer 6 is illustrated in FIG. 2 as comprising a microprocessor or CPU 100 with which various circuits are associated through a common bus 150 to derive ignition timing data representing the timing with respect to the top dead center. An engine speed counter 101 is supplied with the crankangle signal from engine speed sensor 5 to convert it into a corresponding digital value which is fed to the microprocessor 100 and in turn it supplies an interrupt command signal to an interrupt control unit 102 in response to each 30-degree crankangle signal. The interrupt control unit 102 relays the command signal at proper timing to the microprocessor 100 to cause it to interrupt the operation of its preprogrammed main routine. A digital input port 103 is connected to the engine start switch 31 to signal the microprocessor that the engine is in operation. Analog signals from engine operating parameter sensors including coolant temperature sensor 2, intake pressure sensor 8 and battery 13 are coupled to an analog input port 104 for analog-digital conversion and for sequential application to the microprocessor. A random access memory 107 is powered by a power supply circuit 105 permanently coupled to the battery 131 so that memory 107 retains its stored contents during engine standstill periods, while other circuits including read only memory 108 are powered by another power supply circuit 106 coupled via an ignition key switch 18 to the battery 13. An ignition current control unit 109, formed by latches and downcounters (not shown), receives ignition angle data from the microprocessor to generate an ignition primary current for application to the ignition amplifier 7. A timer 111 measures the elapse of time in which the microprocessor 100 is to execute preprogrammed functions.

Figure 3:
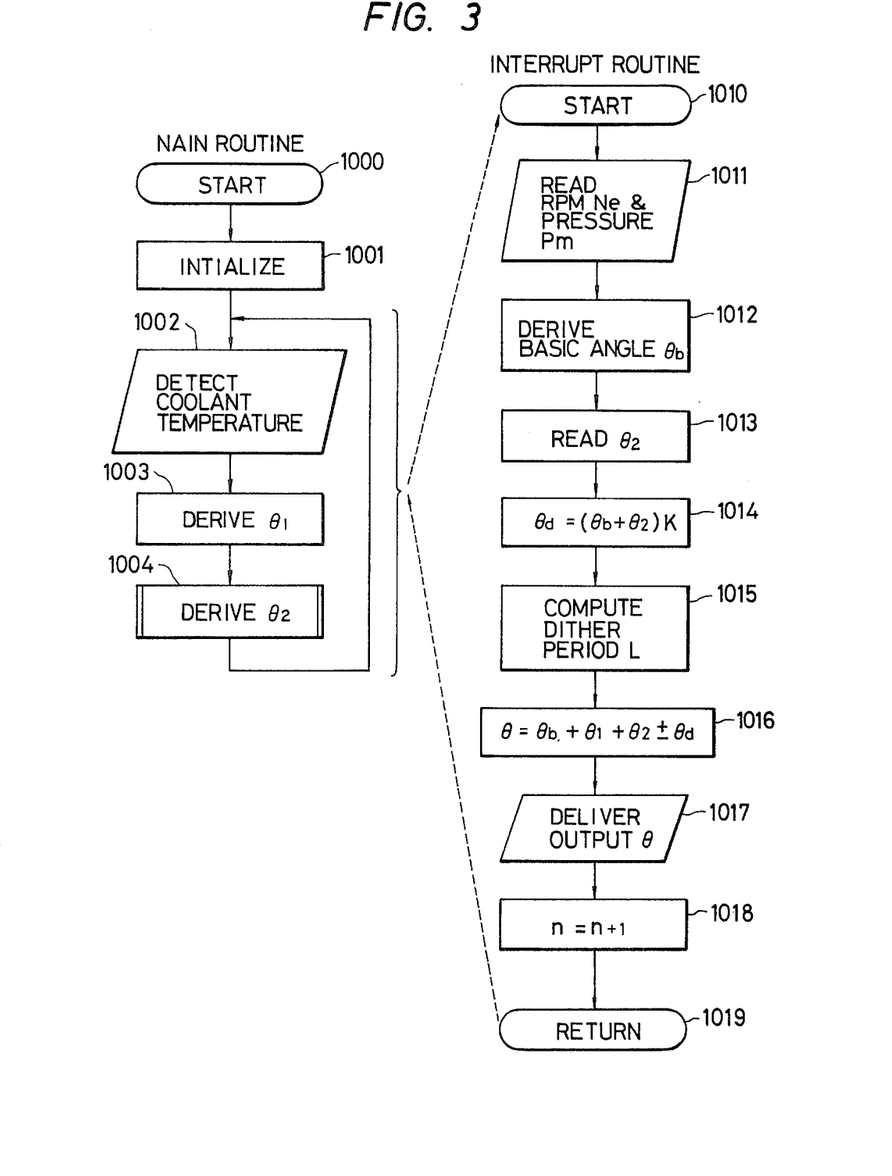
FIG. 3 is a flow diagram describing the program of the microcomputer of FIG. 1.
Figure 5:
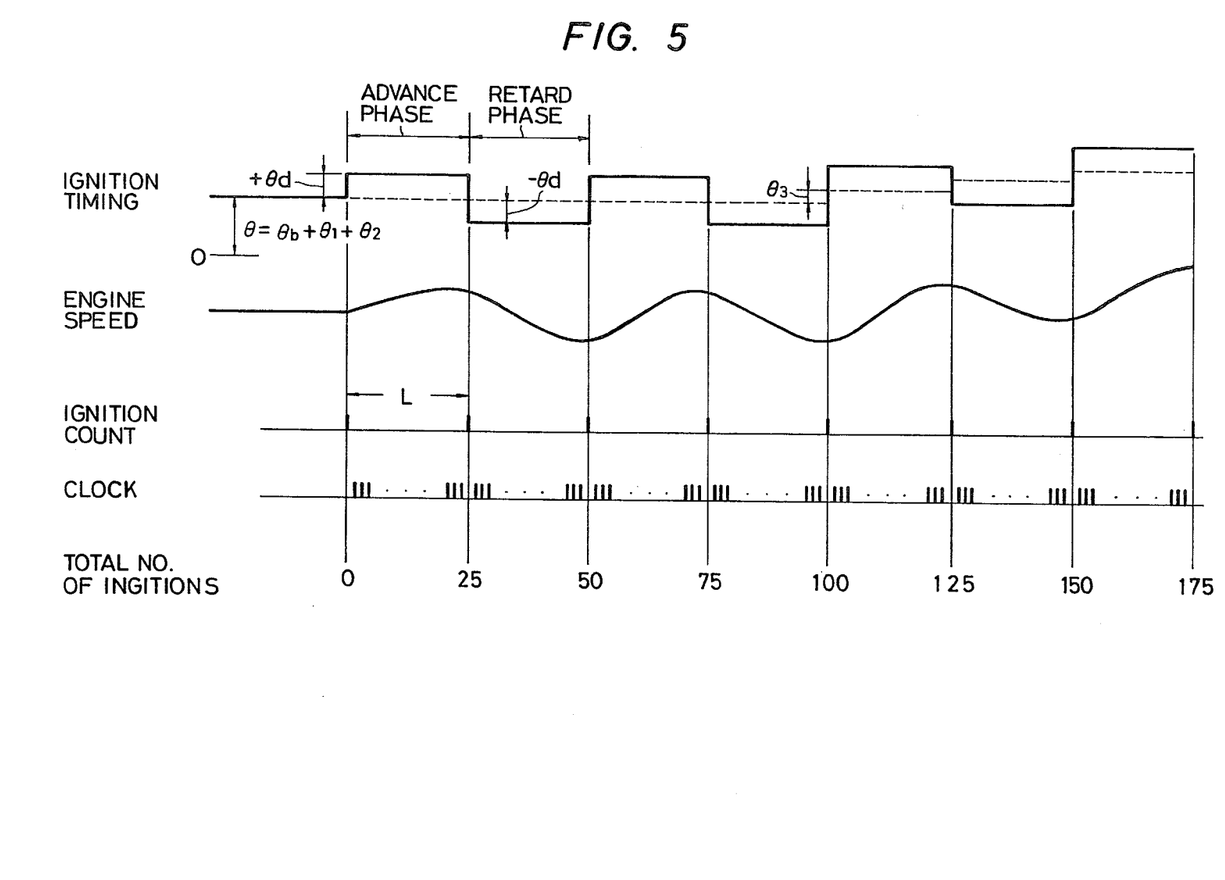
FIG. 5 is a waveform diagram useful for understanding the operation of the invention.

The flow diagram of the main and interrupt routines of the microcomputer 6 is shown in FIG. 3. The main routine 1000 comprises steps 1001, 1002, 1003 and 1004. By execution of the main routine the microprocessor 100 determines a variable reference ignition setting $\theta r$. The main routine 1000 is interrupted at any point of execution to permit the microprocessor to execute an interrupt routine which comprises steps 1010 through 1019. By execution of the interrupt routine the microprocessor derives a dither angle $\theta d$ by which the ignition timing is oscillated on the advance and retard sides of the reference advance setting $\theta r$ as illustrated in FIG. 5, determines the duration of each dithered ignition phase and derives a total amount of advance angles at which ignition actually occurs. The reference advance setting $\theta r$ essentially comprises a basic advance angle $\theta b$ and a temperature compensation angle $\theta 1$. The reference setting is corrected in a direction toward the optimum advance angle by a dither compensation angle $\theta 2$ which is determined by the varying engine speed in relation to the dithered angle.

When the engine is started in response to the operation of the ignition key switch and starter switch, the microprocessor 100 starts executing its programmed function at step 1000 by executing an initializing process in a manner well known in the art. At step 1002 the microprocessor reads off coolant temperature data from the analog input port 104 to derive a temperature correction angle $\theta 1$ at step 1003 to modify the reference setting $\theta r$ according to varying engine coolant temperature. The correction angle $\theta 1$ is stored in RAM 107 for later retrieval. The microprocessor proceeds to step 1004 to derive a dither compensation angle $\theta 2$ in a manner as will be detailed later. After execution of step 1004, the microprocessor returns to step 1002 to recyclically execute the steps 1002 to 1004.

In response to an interrupt command signal the main routine is interrupted to execute an interrupt routine that commences at step 1011 where the microprocessor reads engine speed data Ne and intake air pressure data Pm respectively from counter 101 and analog input port 104 and load them into the random access memory 107.

Figure 6:
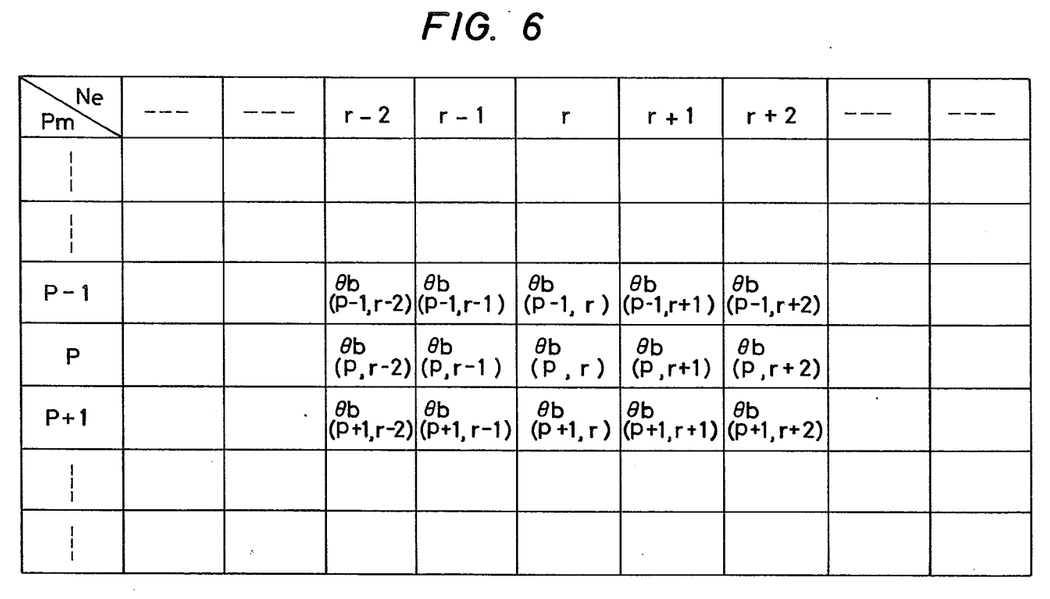
FIG. 6 is an illustration of an example of a lookup table used in deriving the basic ignition angle data.
Figure 7:
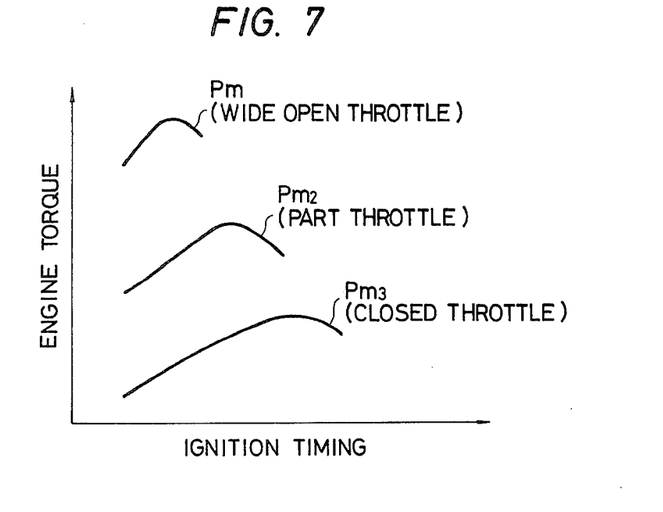
FIG. 7 is a graphic illustration of the operating characteristic of an internal combustion engine which is used to control the amount of ignition dither.

At step 1012 the microprocessor 100 derives a basic advance angle $\theta b$ from a RAM's lookup table as shown in FIG. 6 as a function of the stored engine speed and intake pressure data and goes to step 1013 to read dither compensation angle $\theta 2$ out of a lookup table similar to that shown in FIG. 6 as a function of the engine speed and pressure data. It is generally known in the art that at a given engine speed the pressure (load) in the intake manifold is related to advance angle and engine torque as illustrated in FIG. 7. At closed throttle the intake manifold has a minimum torque gradient as a function of advance angle, whereas at full throttle the torque gradient is at maximum. According to the invention the amount of dither is determined as function of such engine operating parameters. This variable dithering provides less fuel consumption in a wide range of engine operating conditions and keeps the engine speed variations to within a small range. This is accomplished at step 1014. In this step a dither advance angle $\theta d$ is derived when the engine is in an advanced dither phase (see FIG. 5) or a dither retard angle $\theta d$ is derived when the engine is in a retarded dither phase. In either dithered phase the microprocessor determines the dither angle $\theta d$ by calculating a formula $(\theta b + \theta 2) \times K$, where K is a variable coefficient derived from a lookup table in which a set of experimentally derived values of K is stored as a function of the detected intake air pressure values Pm so that the amount of dither $\theta d$ is rendered inversely variable as a function of intake air pressure.

According to the invention the dither attributed engine speed variation is kept to a constant value by varying the length of dither phase as a function of the amount of dither $\theta d$ determined at step 1014. For this purpose a lookup table is stored in RAM 107 in such a manner that in response to dither $\theta d$ proper dither period data L is read out of the memory. The data L indicates the number of ignitions to be effected in response to the previously determined dither angle. This is accomplished in a subsequent step 1015.

Figure 8:
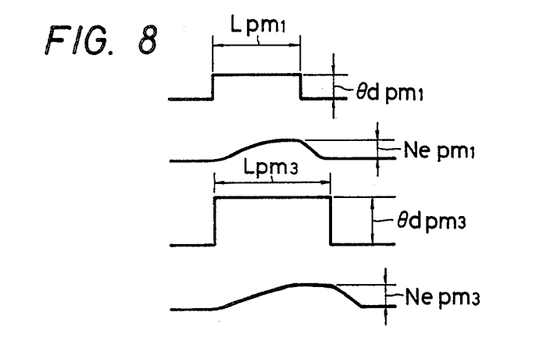
FIG. 8 is a timing diagram illustrating dithered ignition angles in response to different engine operating parameters.

The dither angle $\theta d$ and its duration are seen to vary as shown in FIG. 8. At full throttle operation the ignition is dithered with a relatively small value $\theta dpm1$ for a relatively small period Lpm1 corresponding to pressure curve Pm1 (FIG. 7), and at closed throttle operation it is dithered with a relatively large value $\theta dpm3$ for a longer period Lpm3 corresponding to pressure curve Pm3. The resultant engine speed variations Nepm1 and Nepm3 for intake pressure values Pm1 and Pm3 are seen to be held substantially at equal values. At step 1016 final ignition timing datum $\theta$ is derived by totalizing $\theta b$, $\theta 1$, $\theta 2$ and $\theta d$, the datum $\theta$ being delivered to the ignition current control unit 109 at step 1017 to provide ignition at advance angle $\theta$. At step 1018, the ignition count value "n" is incremented by "1" and at step 1019 the microprocessor returns to the main routine.

Figure 4:
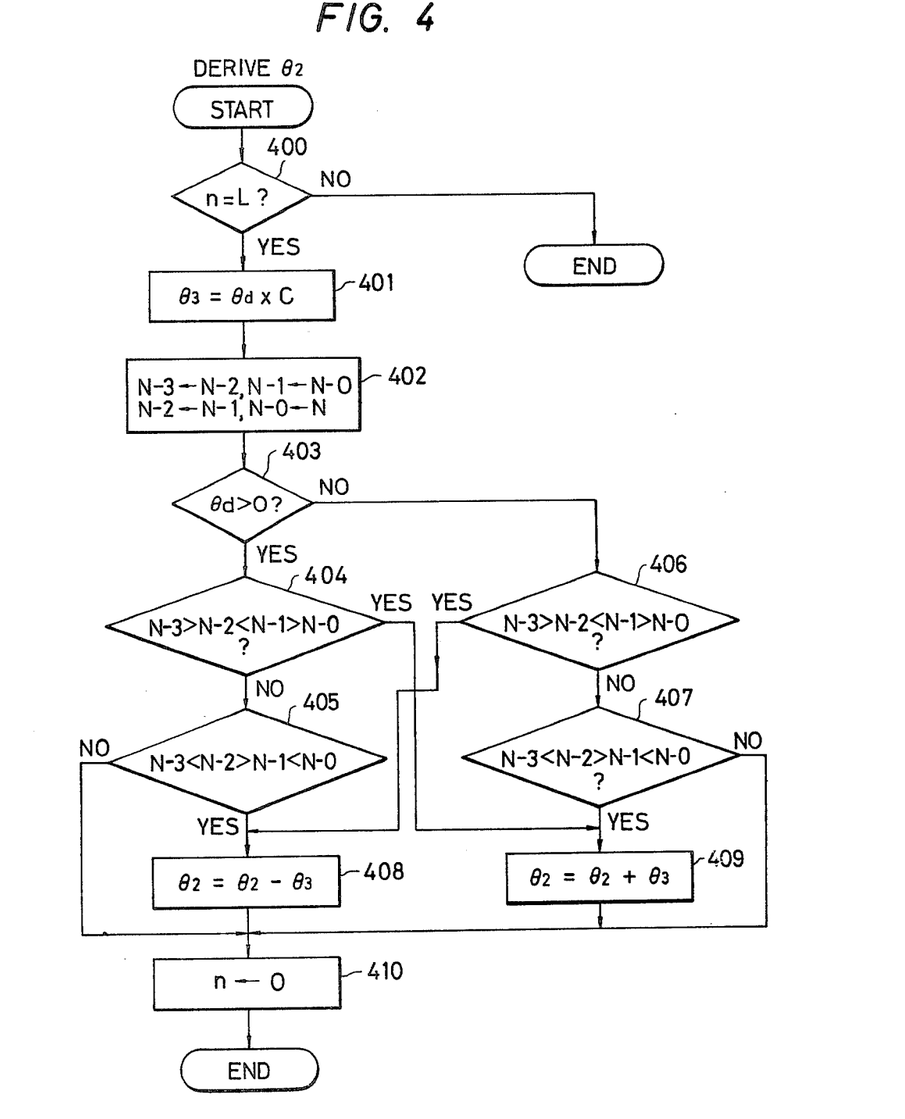
FIG. 4 a flow diagram describing the detail of a step of the main routine of FIG. 3.

Details of main routine step 1004 are shown in FIG. 4. The derivation of a dither compensation angle $\theta 2$ commences at step 400 in which the ignition count value "n" is compared with the dither period L determined in the interrupt routine and if n is smaller than L the step 400 is terminated. Therefore, ignition occurs repeatedly "L" times during each dither phase. At the end of each dither phase, the microprocessor proceeds to a step 401 to generate a correction angle datum $\theta 3$ for updating the dither compensation angle $\theta 2$ which was used in the previous dither phase. The correction datum $\theta 3$ is derived from a lookup table storing a set of data "C" which are determined as a function of ignition timing and engine torque. This correction improves engine driveability and rapidly stabilizes the ignition timing to an optimum position.

At step 402, the identification codes of the memories that store the numbers of clock pulses counted in successive dither phases are updated by shifting the previous codes N, N-0, N-1, N-2 to new codes N-0, N-1, N-2 and N-3, respectively. At step 403, the dither angle $\theta d$ determined at step 1014 is checked against zero to see on which side of the reference setting $\theta r$ ignition is to be dithered in the next dither phase. If the next ignition phase is to be dithered on the advance side, the microprocessor goes to a step 404. At step 404, the clock counts stored in memories N-3, N-2, N-1 and N-0 are compared against each other to detect whether they establish a relationship N-3>N-2<N-1>N-0. This relationship is established only when the engine speed value in each of the advanced dither phases is greater than that in each retarded dither phase. This means that an optimum position of ignition timing is located on the advance side of the reference setting. When this occurs the program execution point goes to a step 409 to add the correction angle $\theta 3$ derived at step 401 to each of the dither compensation angle data $\theta 2$ stored in RAM 107 so that the latter is corrected to compensate for the latest engine operating parameter or parameters. If the above relationship is not satisfied at step 404, the latter is followed by a step 405 to detect a relationship N-3<N-2>N-1<N-0. This relationship is established only when the engine speed value in each advance phase is smaller than that in each retard phase. This signifies that the position of optimum ignition timing is located on the retard side of the reference setting. Therefore, at step 408 the correction angle $\theta 3$ is subtracted from each of the dither compensation angle $\theta 2$ stored in RAM 107. If the relationship stated in the step 405 is not satisfied, no correction is made in the dither compensation data $\theta 2$ and a step 410 is executed to reset the clock count "n" to zero.

If the next phase is to be dithered on the retard side of the reference, a step 406 is executed to detect whether the same relationship as described in the step 404 is established. Decision made at step 406 differs from the decision made at step 404 in that the step 408 is executed subsequently when the engine speeds in retard phases each exceed those in advance phases signifying that the position of optimum ignition timing is located on the retard side of the reference setting. If such condition is not detected the step 406 is followed by a step 407 to check for the existence of the same relationship as that stated in the step 405 to detect whether the engine speeds in the retard phases are each lower than those in the advance phases signifying that the position of optimum ignition timing is located on the advance side of the reference setting. If the latter condition is not detected, the step 407 is followed by the step 410 resetting the clock to zero to return to the step 1002.

In an alternative embodiment the clock counts used in the steps 404, 405, 406 and 407 for comparison purposes could be derived either from the full length of each ignition phase or from a prefixed portion of the second half period of each ignition phase.

Figure 9A:
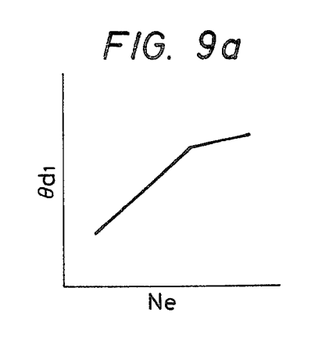
FIGS. 9a and 9b are graphic illustrations of dither ignition angles as a function of engine speed and intake air pressure, respectively.
Figure 9B:
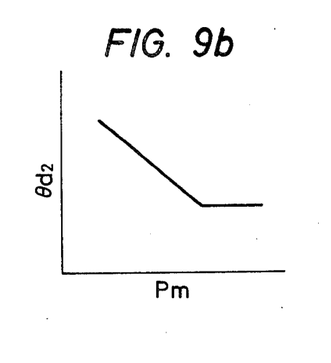

In a modified embodiment of the invention, the derivation of dither angle $\theta d$ could also be achieved by storing a set of $\theta d1$ as a function of engine speed values Ne and a set of $\theta d2$ as a function of pressure values Pm in RAM 107 as illustrated respectively in FIGS. 9a and 9b and combining data $\theta d1$ and $\theta d2$ after retrieval from the memory.

What is claimed is:

1. A method of operating an internal combustion engine at optimum output torque under varying operating conditions, said engine having an adjustable engine ignition timing variable, the setting of which controls the output torque, the method comprising:
   (a) oscillating the setting of the ignition timing variable on opposite sides of a variable reference setting;
   (b) sensing an output variable of said engine during at least three successive phases of the oscillation;
   (c) detecting whether the sensed output variable establishes one of first and second sequential relationships of a plurality of possible sequential relationships indicating that said variable reference setting is on one of first and second sides, respectively, of an optimum position;
   (d) adjusting said variable reference setting toward said optimum position in resonse to one of said detected first and second sequential relationships;
   (e) detecting an engine operating parameter;
   (f) varying at least one of the magnitude of the oscillation, the number of ignitions over which each of said phases occurs and the amount of said adjusting in said step (d) as a function of said detected engine operating parameter; and
   (g) repeating said steps (a) through (f).

2. A method of claim 1, wherein said engine operating parameter detecting step includes the steps of detecting the speed of said engine and the intake air pressure of said engine.

3. A method of claim 2, wherein said varying step comprises the step of varying the magnitude of said oscillation as a function of said detected engine speed and said detected intake air pressure in synchronism with ignition timing.

4. A method of claim 1 or 2, wherein said varying step comprises the step of varying the length of said phase as a function of the magnitude of said oscillation.

5. A method of claim 2, further comprising the step of varying said variable reference setting as a function of said detected engine speed and said detected intake air pressure in synchronism with ignition timing.

6. A method of claim 1 or 2, wherein:
said operating parameter detecting step includes the step of detecting the temperature of said engine; and
said method further comprises the step of varying said variable reference setting as a function of said detected engine temperature.

7. A method of operating an internal combustion engine at optimum output torque under varying operating conditions, said engine having an adjustable spark ignition variable, the setting of which controls the output torque, said method comprising:
(a) constantly sensing an engine operating variable;
(b) generating a reference ignition timing value as a function of said sensed engine operating variable;
(c) generating a dither ignition timing value which varies on opposite sides of zero as a function of said sensed engine operating variable;
(d) summing said reference and dither ignition timing value;
(e) causing ignition to occur repeatedly, at a timing related to said summed ignition timing values so that ignition timing is oscillated on opposite sides of said reference timing by an amount proportional to said dither ignition timing value;
(f) sensing the instantaneous speed value of said engine during at least three successive periods of the oscillation of said ignition timing;
(g) comparing the sensed engine speed values against each other and detecting whether they establish one of first and second predetermined relationships of a plurality of possible sequential relationships indicating that said reference ignition timing value is greater or smaller than an optimum value; and
(h) modifying said reference ignition timing value toward said optimum value in response to one of said first and second sequential relationships by an amount which is a function of said engine operating variable.

8. A control system for operating an internal combustion engine at optimum output torque under varying operating conditions, said engine having an adjustable engine ignition timing variable the setting of which controls the output torque, said system comprising:
means for sensing an engine operating parameter; and
data processing means for: (1) oscillating the setting of said ignition timing variable on each side of a variable reference setting, (2) sensing an output variable of said engine during at least three successive phases of the oscillation, (3) detecting whether said sensed engine output variable establishes one of first and second predetermined sequential relationships of a plurality of possible sequential relationships indicating that said variable reference setting is on one of first and second sides, respectively, of an optimum position, (4) adjusting said variable reference setting toward said optimum position in response to one of said detected first and second sequential relationships, and (5) varying at least one of the magnitude of the oscillation, the number of ignitions over which each of said phases occurs and the amount of said adjusting of said variable reference setting as a function of said detected engine operating parameter.

9. A control system as claimed in claim 8, wherein said data processing means varies the length of said phase as a function of the magnitude of said oscillation.

10. A control system as claimed in claim 8 or 9, wherein:
said sensing means includes means for sensing the speed of the said engine and means for sensing the intake air pressure of said engine; and
said data processing means varies the magnitude of said oscillation as a function of said sensed engine speed and said sensed intake air pressure in synchronism with the ignition timing.

11. A control system as claimed in claim 8 or 9, wherein:
said sensing means includes means for sensing the speed of said engine and means for sensing the intake air pressure of said engine; and
said data processing means varies said variable reference setting as a function of said sensed engine speed and said sensed intake air pressure in synchronism with the ignition timing.

12. A control system as claimed in claim 8 or 9, wherein:
said sensing means includes means for sensing the temperature of said engine; and
said data processing means varies said variable reference setting as a function of said sensed engine temperature.

* * * * *